United States Patent [19]
Back, Sr.

[11] Patent Number: 5,793,581
[45] Date of Patent: Aug. 11, 1998

[54] MAGNETIC TAPE CARTRIDGE AND SYSTEM

[76] Inventor: Forest H. Back, Sr., 8750 Frederick Pike, Dayton, Ohio 45414

[21] Appl. No.: 832,381

[22] Filed: Apr. 2, 1997

Related U.S. Application Data

[63] Continuation-in-part of Ser. No. 523,110, Sep. 5, 1995, abandoned, which is a continuation-in-part of Ser. No. 278,926, Jul. 22, 1994, abandoned.

[51] Int. Cl.$^6$ .................................................. G11B 23/02
[52] U.S. Cl. ........................................ 360/132; 360/137
[58] Field of Search ................................ 360/132, 137, 360/93, 90, 96.4; 242/345, 191, 192; 318/308; 226/181, 170–172; 264/255

[56] References Cited

U.S. PATENT DOCUMENTS

| | | | |
|---|---|---|---|
| Re. 33,224 | 5/1990 | Speigelstein | 360/93 |
| 3,501,564 | 3/1970 | Snoeyenbos et al. | 264/255 |
| 3,575,361 | 4/1971 | Wildhagen | 242/345 |
| 3,582,743 | 6/1971 | Diaz et al. | 318/308 |
| 3,667,701 | 6/1972 | Blum | 242/352 |
| 3,692,255 | 9/1972 | Von Behren | 242/192 |
| 3,976,262 | 8/1976 | Kennedy | 242/192 |
| 4,122,985 | 10/1978 | Nelson | 226/181 |
| 4,242,709 | 12/1980 | Stricker | 360/96.4 |
| 4,701,816 | 10/1987 | Ida | 360/96.4 |
| 5,210,664 | 5/1993 | Perona | 360/93 |

*Primary Examiner*—Tom Thomas
*Assistant Examiner*—Adriana Giordana
*Attorney, Agent, or Firm*—Killworth, Gottman, Hagan & Schaeff LLP

[57] ABSTRACT

The present invention provides a magnetic tape system which experiences a reduced, if not eliminated, amount of slippage between the drive roller of the tape drive system and the driven roller of the magnetic tape cartridge. The present invention employs a hard plastic driven roller having a slightly enlarged diameter portion to which an elastomeric, rubber-like material is bonded. The elastomeric material has the form of an annular sleeve or ring which is coextensive with a slightly enlarged diameter portion of the driven roller to provide a reduced slippage annular contact surface for contacting a portion of a rubber outer sleeve positioned on the capstan, or drive roller, of a conventional magnetic tape drive.

15 Claims, 2 Drawing Sheets

MAGNETIC TAPE CARTRIDGE AND SYSTEM

CONTINUATION DATA

This application is a continuation-in-part of application Ser. No. 08/523,110 filed Sep. 5, 1995 having the title "Structure Minimizing Slippage of the Capstan Upon Sequential Starting and Stopping of the Drive Belt Mechanism on Computer Data Mini Cartridges", now abandoned, which is a continuation-in-part of Ser. No. 08/278,926 filed Jul. 22, 1994 having the same title, now abandoned.

BACKGROUND OF THE INVENTION

Present day computer technology utilizes cartridges containing magnetic tape for the storage of data. These magnetic tape cartridges contain a capstan, also called a puck, and a pulley, sometimes called a drive belt, which drives a plastic driven roller in the cartridge to advance the magnetic tape containing the data. However, upon sequential stopping and starting of the pulley, or drive belt, these cartridge experience slippage between the capstan and the driven roller. This slippage causes improper writing of information to and reading of information from the tape by the computer resulting in loss of information and faulty printouts of information obtained therefrom. Various attempts have been made in the art to solve the problem of slippage induced by sequential starting and stopping of the pulley or drive belt mechanism of this type of cartridge.

U.S. Pat. No. 3,575,361 to Wildhagan is directed to a tape cartridge including a rotatably mounted drive roller formed of plastic having a circumferential covering of a frictional material such as natural or artificial rubber. The drive roller transmits motion to two stacked tape supporting reels rotatably mounted on movable axes within the cartridge. The tape-supporting reels are biased into engagement with the drive roller by a complicated arrangement which reversibly transfers a length of tape from one reel to the other. A tape-loop roller rotatably mounted for engagement with the drive roller displaces the tape vertically for alignment with each of the tape-supporting reels.

U.S. Pat. No. 4,242,709 issued to Stricker describes a strip media drive system utilizing an endless belt to couple the rotation of a pair of rotatable strip media packs which reel the strip media therebetween, and a belt tensioner which creates a greater tension in the portion of the endless belt leaving the tensioner than in the portion entering the tensioner.

U.S. Pat. No. 3,582,743 to Diaz et al. discloses a tape recorder/reproducer apparatus including a variable speed motor for the drive train energized through a closed-loop servo system in which the actual output speed of the motor is monitored by a sensor and compared to a reference, to closely control the motor speed in accordance with the reference.

U.S. Pat. No. 5,210,664, issued to Perona, is directed to a magnetic tape drive for driving magnetic tape in a cartridge of the type in which a driven roller in an exposed edge of the cartridge moves the tape past a read/write head in the drive. A drive roller in the drive is rotated by the drive motor. The drive motor engages an idler capstan which, in turn, engages the driven roller in the cartridge. When a cartridge is inserted into the drive, the driven roller in the cartridge engages a resilient periphery of the drive roller. The idler capstan and the driven roller are rotated by the drive roller to move the magnetic tape in the cartridge. Because of the use of an idler capstan, changes in the diameter of the idler capstan, caused by wear of the resilient periphery, should not affect the speed of the tape.

U.S. Pat. No. 3,667,701 to Blum discloses a magnetic tape apparatus including a tape magazine having take-up and supply reels whose rims are engaged by constant torque slip clutches which are concurrently engaged with the reels driving them in opposite directions to maintain the length of tape extending between the reels in a tension condition. To drive the tape back and forth, the apparatus includes a shuttle bar having idler rollers which move alternatively between two counter-rotating capstans to engage two guide rollers mounted in the magazine itself to move the tape in a forward or reverse direction.

An additional data cartridge, currently in widespread use in the industry, is shown and described in a booklet entitled *Data Security Handbook* published by the 3-M Company and more specifically described and shown on pages 10–12 of that booklet.

However, these devices still experience slippage resulting from the use of a hard plastic driven rollers and rubber coated capstans. Accordingly, a need exists in the art for a magnetic tape cartridge and system in which the slippage problem is reduced, if not totally eliminated.

SUMMARY OF THE INVENTION

The present invention is directed to an improved structure for reducing, and even preventing, slippage between the capstan of a magnetic tape drive and the driven roller of a magnetic tape cartridge upon sequential starting and stopping of the drive belt mechanism of the magnetic tape cartridge.

The present invention employs a hard plastic driven roller having a slightly enlarged diameter portion to which an elastomeric, rubber-like material is bonded. The elastomeric material has the form of an annular sleeve or ring which is coextensive with a slightly enlarged diameter portion of the driven roller to provide a reduced slippage annular contact surface for contacting a portion of a rubber outer sleeve positioned on the capstan, or drive roller, of a conventional magnetic tape drive.

One aspect of the present invention provides for a magnetic tape system. The magnetic tape system includes a magnetic tape drive and a magnetic tape cartridge. The tape drive includes a drive roller and a drive mechanism for driving the drive roller. The drive roller has an annular contact surface formed by at least one layer of elastomeric material.

The magnetic tape cartridge is operatively adapted to engage the magnetic tape drive. The cartridge includes two spools oriented side-by-side and generally coplanar to one another having a magnetic tape connected between the spools and wound around at least one of the spools. The tape cartridge also includes a driven roller for driving a drive belt in frictional engagement with the spools so as to effect the movement of the magnetic tape between the spools. The driven roller has another annular contact surface formed by at least one layer of elastomeric material.

The driven roller is driven by the drive roller by bringing the contact surface of the driven roller and the contact surface of the drive roller in contact under an applied contact force while the drive roller is being driven by the drive mechanism. Each of the contact surfaces is formed from an elastomeric material so as to enable the drive roller to drive the driven roller under an applied contact force that is lower than the contact force needed between contact surfaces formed from an elastomeric material and a plastic material.

In another aspect of the invention, a magnetic tape cartridge for use with a magnetic tape drive having a drive roller with an annular contact surface formed by a layer of elastomeric material is provided. The magnetic tape cartridge includes a housing, two tape spools, two tape guides, a magnetic tape, a driven roller, two guide rollers and a drive belt. The two tape spools are mounted in the housing generally coplanar to one another. The two tape guides are mounted so as to be spaced apart in the housing. The magnetic tape is connected between the spools, wound around at least one of the spools, and guided between the spools by the tape guides. The driven roller has a larger diameter portion and a smaller diameter portion. The larger diameter portion has at least one layer of elastomeric material forming a contact surface. The driven roller is mounted in the housing and dimensioned so as to allow the contact surface to make frictional contact with a contact surface of elastomeric material on a drive roller. The two guide rollers are mounted so as to be spaced apart in the housing. Finally, the drive belt is mounted in a continuous loop around the guide rollers. The drive belt makes frictional contact with the smaller diameter of the driven roller so as to be moved along the loop when the driven roller is driven. The drive belt frictionally engages each of the spools so as to move the magnetic tape between the spools as the drive belt is moved.

In still another aspect of the present invention, a magnetic tape system is provided. The tape system comprises a magnetic tape drive and a magnetic tape cartridge. The magnetic tape drive includes a drive mechanism for driving a drive roller having an annular contact surface formed by at least one layer of elastomeric material.

The magnetic tape cartridge is operatively adapted to engage the magnetic tape drive. The cartridge includes a housing, two tape spools, two tape guides, a magnetic tape, a driven roller, two guide rollers and a drive belt. The two tape spools are mounted in the housing generally coplanar to one another. The two tape guides are mounted so as to be spaced apart in the housing. The magnetic tape is connected between the spools, wound around at least one of the spools, and guided between the spools by the tape guides. The driven roller has a larger diameter portion and a smaller diameter portion. The larger diameter portion has at least one layer of elastomeric material forming another annular contact surface. The driven roller is mounted in the housing and operatively adapted so as to allow its contact surface to make frictional contact with the contact surface of the drive roller when the magnetic tape cartridge is engaged with the magnetic tape drive. The two guide rollers are mounted so as to be spaced apart in the housing. The drive belt is mounted in a continuous loop around the guide rollers. The drive belt is moved by the driven roller along the loop when the driven roller is driven by the drive roller. The drive belt frictionally engages each of the spools so as to wind the magnetic tape onto one of the spools as the drive belt is moved.

The driven roller is driven by the drive roller by bringing the contact surface of the driven roller and the contact surface of the drive roller in contact under an applied contact force while the drive roller is being driven by the drive mechanism. Each of the contact surfaces is formed from an elastomeric material so as to enable the drive roller to drive the driven roller under an applied contact force that is lower than the contact force needed between contact surfaces formed from an elastomeric material and a plastic material.

The object of the present invention is to provide a magnetic tape system having a reduced, if not eliminated, slippage problem between the drive roller of the tape drive and the driven roller of the tape cartridge. These and other objects, and the features and advantages of the present invention will become apparent from the following detailed description, the accompanying drawings and the appended claims.

DETAILED DESCRIPTION OF THE INVENTION

Figure 1:
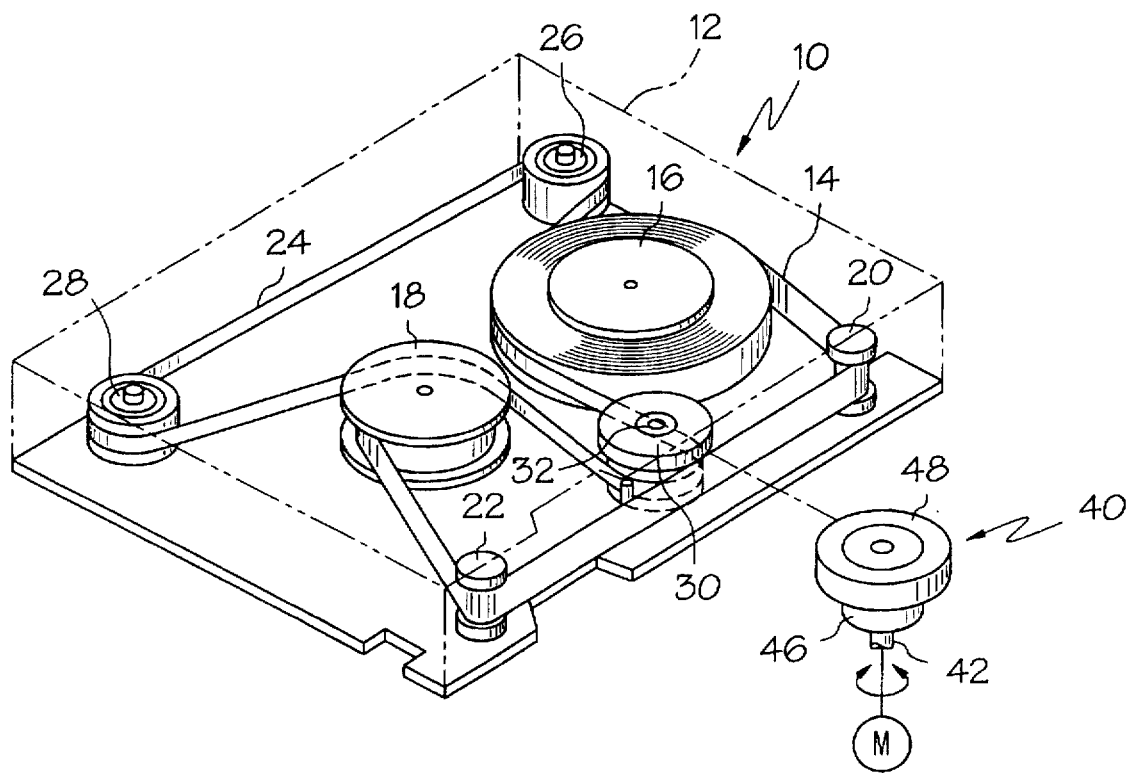
FIG. 1 is a perspective view of a prior magnetic tape cartridge showing the cartridge housing in phantom line for clarity, with a portion of the apparatus exploded.
Figure 2:
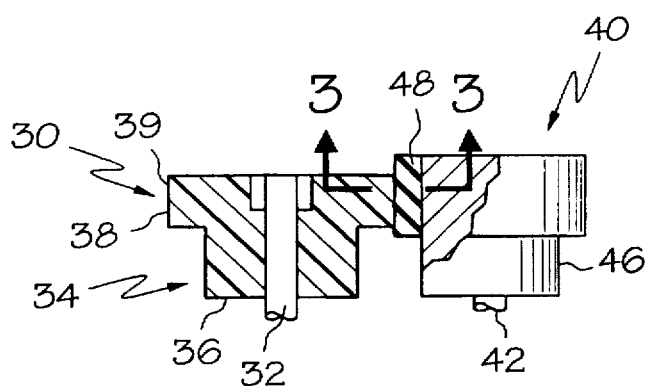
FIG. 2 shows a sectional view of the prior art device with the driven roller and puck illustrated in FIG. 1 being in section and having parts broken away.
Figure 3:
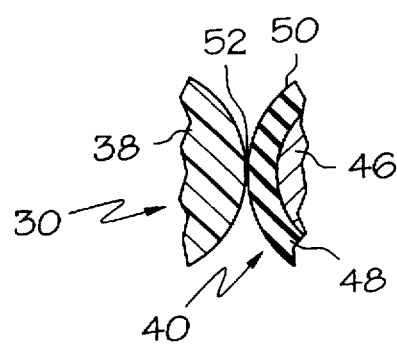
FIG. 3 is a fragmentary cross sectional view of the same prior art device taken along the lines 3—3 of FIG. 2 to show the contact surface where the slippage occurs.

A prior art magnetic tape cartridge 10 can be seen in FIGS. 1–3 with its housing 12 shown in phantom lines. The cartridge 10 contains a magnetic tape 14 mounted on spools, or reels, 16 and 18. The tape 14 extends between spools 16 and 18 and around tape guides 20 and 22.

A drive belt 24, which moves the spools 16 and 18 containing the magnetic tape 14, extends around guide rollers 26 and 28 and a driven roller 30. Driven roller 30 is mounted for rotation about an axle 32. Driven roller 30 comprises a hub 34 having an integral main body portion 36 and an enlarged diameter portion 38. Enlarged diameter portion 38 has an outer, contact surface 39. Hub 34 is typically formed of a hard plastic material which provides a surface having a low coefficient of friction.

A capstan, or puck, 40 mounted on a drive shaft 42 drives driven roller 30. Drive shaft 42 is driven by a drive mechanism 44. As can be seen in FIGS. 2 and 3, the capstan 40 has a hub portion 46 on which a rubber outer sleeve 48 is mounted. The rubber outer sleeve 48 provides a contact surface 50. The engagement between the enlarged diameter portion 38 of the driven roller 30 and the contact surface 50 afforded by rubber outer sleeve 48 forms an annular contact surface 52.

However, the tape cartridge 10 still experiences slippage about the annular contact surface 52 which results in improper reading of data from and recording of data to the magnetic tape 14. Slippage occurs when the low friction enlarged diameter portion 38 of the plastic driven roller 30 makes improper contact with the outer sleeve 48 on capstan 40. Further, to reduce slippage as much as is practicable with this type of cartridge 10, a large amount of contact force must be applied to the annular contact surface 52.

Figure 4:
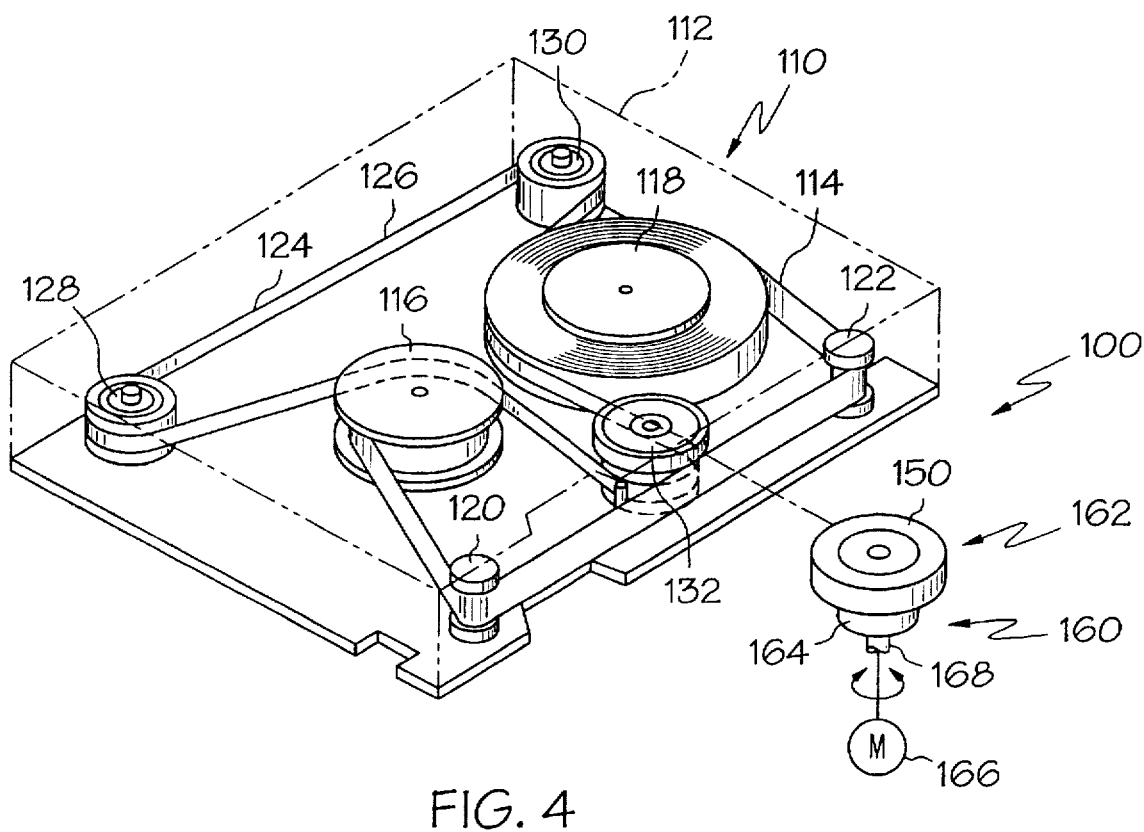
FIG. 4 is a perspective view of the magnetic tape system of this invention.
Figure 5:
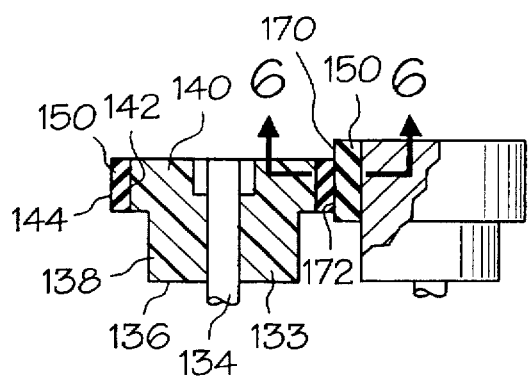
FIG. 5 is a sectional view of the present invention.
Figure 6:
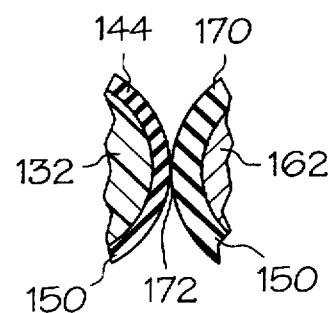
FIG. 6 is a fragmentary cross-sectional view illustrating the present invention and taken along the lines 6—6 of FIG. 5.

A magnetic tape system 100 of the present invention can be seen in FIGS. 4–6. The system 100 comprises a magnetic tape cartridge 110 and a magnetic tape drive 160. Cartridge 110 of the present invention is shown in FIGS. 4–6 with its housing 112 in phantom lines. The cartridge 110 is operatively adapted to engage the magnetic tape drive 160.

The cartridge 110 contains a magnetic tape 114 mounted on spools, or reels, 116 and 118. Spools 116 and 118 are generally oriented side-by-side and coplanar to one another in housing 112. The tape 114 extends around tape guides 120 and 122 which are generally spaced apart in housing 112.

A drive belt 124 frictionally engages the spools 116 and 118 containing the magnetic tape 114 to move the tape 114 between the spools 116 and 118 as the drive belt 124 is moved. The drive belt 124 is mounted in a continuous loop 126 which extends around guide rollers 128 and 130 and a driven roller 132. As can be seen in FIG. 5, driven roller 132 is mounted for rotation about an axle 134. Driven roller 132 comprises a hub 136 having a small diameter portion 138 and a larger diameter portion 140. The larger diameter portion 140 has an outer surface 142. The drive belt 124 is in frictional contact with the small diameter portion 138 of the driven roller 132. Driven roller 132 has at least one layer of an elastomeric material 150 bonded to the hub 136 forming an annular contact surface 144. Desirably, the elastomeric material 150 is molded to the outer surface 142 of the larger diameter portion 140 of driven roller 132, as shown in FIG. 5.

The tape drive 160 comprises a drive roller 162, a drive mechanism 166, such as a motor, and a drive shaft 168. The drive roller 162, also known as a puck or capstan, is mounted on a drive shaft 164 and drives driven roller 132. Drive mechanism 166 drives drive shaft 168. As can be seen in FIGS. 5 and 6, the drive roller 162 has a hub portion 164 on which an outer sleeve 166 is mounted. Typically, hub 164 is formed of a metal or metal-like material and outer sleeve 166 is formed from an elastomeric, rubber-like material 150. The outer sleeve 166 has an outer, annular contact surface 170.

The contact surface 144 of the larger diameter portion 140 of the driven roller 132 and the annular contact surface 170 afforded by rubber outer sleeve 166 form a contact area or nip 172 to drive the driven roller 132. Drive roller 162 drives driven roller 132 by engaging driven roller 132 under an applied contact force at the nip 172. It will understood by one of skill in the art that the driven roller 132 is dimensioned to allow the contact surface 144 of the larger diameter portion 140 to make contact with the annular contact surface 170 of the drive roller 162. When drive roller 162 engages driven roller 132 to drive driven roller 132, tape 114 is disposed between the drive roller 162 and the driven roller 132 but not between the nip 172 of the driven roller 132 and the drive roller 162.

As the driven roller 132 rotates, the drive belt 124 rotates around driven roller 132 and guide rollers 128 and 130. As drive belt 124 rotates around driven roller 132 and guide rollers 128 and 130, drive belt 124 rotates spools 116 and 118 by frictionally engaging the spools 116 and 118. As the spools 116 and 118 are rotated, the tape 114 moves from one spool 116 to the other spool 118, or vice versa, around tape guides 120 and 122. As the tape moves between spools 116 and 118, it passes over a read/write head (not shown) so that electronic information, such as computer data, can be read from or transferred to the tape 114.

An elastomeric, or rubber-like, friction material 150 is molded to the driven roller 132 to reduce slippage between the drive roller 162 and the driven roller 132 by providing a layer which increases the frictional contact between the driven roller 132 and the drive roller 162. Because it is molded to the driven roller 132, the elastomeric material 150 is mechanically and/or chemically bonded to the surface on which it is molded. This elastomeric material 150 on the driven roller 132 allows the driven roller 132 to be driven under an applied contact force which is less than the contact force needed between contact surfaces, such as contact surface 39 and contact surface 50 of the prior art cartridge 10, formed from an elastomeric material and a plastic material.

The elastomeric materials 150 useful in the present invention include elastomers and materials which possess rubber-like properties and which provide higher friction contact surfaces than the plastic materials currently in use in the art. Elastomers are generally characterized as all substances having the properties of natural, reclaimed, vulcanized or synthetic rubber. Those properties include but are not limited to the abilities to stretch under tension, to have a high tensile strength, to retract rapidly after deformation, and to recover fully to the original dimensions. Thus, almost any material displaying these properties may be employed in the present invention.

The elastomeric materials 150 that have been found, or are believed, to be useful in the present invention include, but are not limited to, natural rubbers, butyl rubbers, silicone rubbers, polyacrylate rubbers, nitrile rubbers, isoprene rubbers, butadiene rubbers, EPT rubber, polyether rubbers, thermoplastic rubbers, fluorosilicones, fluoroelastomers, polychloroprene, polyacrylate, polyurethanes, acrylonitriles, styrene butadienes, epoxy resins, various other materials displaying rubber-like properties, and blends of any of the above.

Examples of specific elastomeric materials 150 which are believed desirable for use according to the principles of the present invention include chloroprene manufactured by Bayer under the trade name Baypren; polychloroprene manufactured by Denki USA under the trade name Denka; and neoprene manufactured by DuPont under the trade name Neoprene. Other examples include urethane copolymers of diisocyanate having a polyester or polyether base, such as those manufactured by Uniroyal under the trade names Vibrathane and Adiprene and by TSE Industries under the trade name Millathane. Additional examples include fluoroelastomers or fluorocarbon elastomers, such as those manufactured by 3M Company under the trade names Fluorel and Aflas, by DuPont under the trade name Viton and by Ausimont USA under the trade name Tecnoflon. Further examples include the ethylene/acrylic elastomers manufactured by DuPont under the trade name VAMAC; the acrylic elastomers manufactured by Zeon Chemical under the trade name Hytemp; and the chlorosulfonated polyethylenes manufactured by DuPont under the trade name Hypalon. Of these specific examples of elastomeric materials 150, the Viton and Neoprene manufactured by DuPont appear to be the most desirable.

The elastomeric material 150 useful with the present invention may be a blend of various materials containing rubber-like properties. It is desirable for the elastomeric material 150 to have a hardness of from about 5 to about 90 on a Shore A scale, and more desirable to have a hardness of from about 20 to about 80 on a Shore A scale. Of course, one of ordinary skill in the art will recognize that the optimum elastomeric material 150 employed and the optimum range of Shore A hardness, as well as other properties, will depend upon the particular application in which the present invention is employed.

The elastomeric material 150 is desirably molded to the driven roller 132 of the tape cartridge 110, rather than formed as separate and discrete components, and later assembled to form the driven roller 132. It is believed that any suitable molding technique well known in the art, such as transfer molding, injection molding or compression molding, can be employed in the present invention. It has been found desirable to employ transfer molding techniques. In general, transfer molding involves using both heat and pressure to soften an elastomeric material 150 located in a transfer chamber or cavity, and then forcing the softened material under high pressure through an orifice or transfer port into a closed mold where vulcanization and final curing take place. It is desirable for the elastomeric material 150 to be allowed to cure for between about two minutes to about thirty minutes at temperatures ranging between about 250° F. to about 400° F. (121° C. to 204° C.) and more desirably at temperatures ranging between about 320° F. to about 360° F. (160° C. to 182° C.).

Satisfactory results have been obtained with the DuPont elastomer Neoprene, where the Neoprene has a Shore A hardness of 65, a tensile strength of 2,150 psi, an elongation of 630%, a 200% modulus of 1.175 psi and a specific gravity of 1.57. These mechanical properties were obtained by curing the Neoprene elastomer for fifteen (15) minutes at 324° F. (162° C.). Satisfactory results have also been obtained with components molded with the DuPont elastomer Viton, where the Viton has a Shore A hardness of about 71, a tensile strength of about 1,452 psi, and elongation of about 341%, a 100% modulus of about 495 psi and a specific gravity of about 1.84. These properties were obtained by curing the Viton elastomer for eight (8) minutes at 350° F. (177° C.).

It is desirable for the surface of the driven roller 132 to be prepared before the molding step so as to improve bonding with the elastomeric material 150. Satisfactory results have been obtained with an exemplary surface preparation which includes first removing oil and other contaminants from the surface being molded to by using a suitable degreasing solvent or aqueous solution. Next, the surface to be molded is roughened or otherwise textured, for example, by sand blasting the surface with aluminum oxide "54" grit using compressed air or by a chemical etching method. After the surface has been textured, a primer is applied to the surface by brushing, spraying, etc. It is desirable for the primer to be applied at room temperature or between about 65° F. to about 90° F. (18° C. to 32° C.). Once applied, the primer is allowed to dry for at least about thirty minutes to about one hour before the molding process is begun. While it is more desirable for the surface preparation to include both texturing and the use of a primer, the present invention is not intended to be so limited. For some applications, it may be desirable to only employ one or the other (i.e., texturing or the use of a primer) or neither.

When the DuPont elastomer Viton is used, satisfactory results have been obtained with a primer manufactured by Lord Corporation of Erie, Pa. under the trade name Chemlok Adhesive 5150. When the DuPont elastomer Neoprene is used, satisfactory have been obtained using a primer manufactured by Morton International of West Alexandria, Ohio under the trade name Thixon Adhesive OSN-2.

After the molded driven roller is removed from the mold cavity, it may be desirable to subject the as-molded elastomeric material to a post-cure bake in order to optimize its mechanical properties. When the DuPont elastomer Viton is used, a post-cure bake at 400° F. (204° C.) for sixteen hours has been found to cause an improvement in the mechanical properties of the elastomer. Such a post-cure bake may not be necessary for the DuPont elastomer Neoprene.

The elastomeric material 150 can also be a polyurethane rubber formulation such as the one tabulated hereinbelow:

| COMPONENT: | PARTS BY WEIGHT |
|---|---|
| Polyurethane "Millathane E-34" (marketed by TSE Corporation of Tampa, Florida). | 100.0 |
| Carbon Black "N-330" (marketed by Continental Carbon Co.) having an Iodine No. 82; DBP absorption No. 102; ASTM Tint 106. | 20.0 |
| Stearic Acid "Harwick F-1500" (marketed by Harwick Chemical Corporation). Stearic acid 60-65%, non-toxic white powder, faint odor. Free fatty acid, 99 min. Titer 52–56° C. Iodine No. 15 max. Acid No. 196–205. Sap No. 196–206. | 0.25 |
| Curing Agent "Varox DCP-40C (marketed by R. T. Vanderbilt Company, Inc.) dicumyl peroxide on calcium carbonate, white powder. Density 1.60 ± .03 mg/m³. Assay 39–41.5%. Active oxygen 2.3% min. BAC 001 I2 | 4.0 |
| Curing Agent "Varox 231-XL (marketed by R. T. Vanderbilt Company, Inc.) peroxide crosslinking agent, 1,1-di(t-butylperoxy), white powder. Density 1.41 ± 0.03 mg/m³. Assay 39–41%. Active oxygen 4.0% min. | 1.0 |

This polyurethane rubber described in the above table, when cured by hot molding at 350° F. for eight minutes, has the following physical properties:

| PHYSICAL PROPERTY: | VALUE |
|---|---|
| Hardness (Shore A) | 60 |
| Tensile (p.s.i.) | 725 |
| Elongation Percent | 155 to 200 |
| Modulus | 0 p.s.i. |
| Specific Gravity | 1.14 |
| Mooney Scorch | MS @ 250° F.; |
| | 1. Minimum Reading 13.5 |
| | 2. Time to 10 Pt. Rise 30+ min |
| Rheometer | a. Motor 24 min |
| | b. Temp. 350° F. |
| | c. Arc 3° C. |
| | d. Range 100 |
| | e. Type Die MD |

Desirably, the driven roller 132 is formed of a hard plastic material 133. The plastic material 133 can be any plastic capable of maintaining its structural form without melting or thermal deformation at the temperatures at which the chemical bonding occurs during the molding of the elastomeric material 150 to driven roller 132. Suitable exemplary plastic materials for driven roller 132 include, but are not necessarily limited to, the 10–30% glass reinforced polyetherimide, commercially available under the tradename "Ultem 2300" from General Electric Corporation; the 30% glass filled polyetheretherketone, marketed under the tradename "PEEK"; the polyamide-imide and 30% glass reinforced polyamide-imide, commercially available under the tradenames "Torlon 4203" and "Torlon 5030" by the Amoco Chemicals Corporation, and other like materials having the aforesaid combination of properties.

The tape cartridge 110 of the present invention avoids the slippage problem of the prior art tape cartridge 10 by providing a high friction interface between the drive roller 162 and the driven roller 132. In order to maintain the same level of frictional contact between the contact surfaces of the prior art tape cartridge 10 and the tape cartridge 110 of the present invention, a contact force of 544 grams must be applied by the capstan 40 to the driven roller 30 of the prior art tape cartridge 10 as compared to a force of 155 grams to be applied by the drive roller 162 to the driven roller 132 of the tape cartridge 110 of the present invention. This represents a reduction in force of 72% compared to the prior art cartridge 10. Beside reducing the occurrence of slippage, the cartridge 110 will have a longer useful life due to the decrease in contact force applied by the tape drive 160.

The tape drive system 100 of the present invention is designed for use in a computer data storage system and the tape cartridge 110 is desirably a computer data mini cartridge. However, the tape drive system 100 may be used in any type of system, such as an audio system, which employs magnetic tape for the storage and retrieval of electromagnetic signals. Furthermore, the size of the cartridge 110 may be changed without affecting its performance.

Having described the present invention in detail and by reference to the exemplary embodiments described hereinabove, it will be apparent to a person of skill in the art that numerous modifications and variations to the exemplary embodiments are possible without departing from the scope of the present invention as defined in the appended claims.

What is claimed is:

1. A magnetic tape system comprising:

a magnetic tape drive comprising a drive roller and a drive mechanism for driving said drive roller, said drive roller having an annular contact surface formed by at least one layer of elastomeric material; and a magnetic tape cartridge operatively adapted to engage said magnetic tape drive and comprising two spools oriented side-by-side and generally coplanar to one another, a magnetic tape connected between said spools and wound around at least one of said spools, and a driven roller for driving a drive belt in frictional engagement with said spools, and a driven roller for driving a drive belt in frictional engagement with said spools so as to effect the movement of said magnetic tape between said spools, said driven roller having an annular contact surface formed by at least one layer of an elastomeric material, wherein said drive roller drives said driven roller by bringing said annular contact surface of said driven roller and said annular contact surface of said drive roller in contact under an applied contact force while said drive mechanism drives said drive roller, and each of said annular contact surfaces is formed from an elastomeric material to enable said drive roller to drive said driven roller under said applied contact force which is lower than the contact force needed between contact surfaces formed from an elastomeric material and a hard plastic material which provides a surface having a low coefficient of friction.

2. The magnetic tape system as set forth in claim 1, wherein said magnetic tape is disposed between said driven roller and said drive roller, but not between the contact surfaces of said driven roller and said drive roller, when said drive roller is driving said driven roller.

3. The magnetic tape system as set forth in claim 2, wherein said magnetic tape system is a computer data storage system, said magnetic tape drive forms part of a computer and said magnetic tape cartridge is a computer data mini cartridge.

4. The magnetic tape system as set forth in claim 1, wherein said driven roller has a larger diameter portion and a smaller diameter portion, the contact surface of said driven roller is disposed on said larger diameter portion, and said drive belt is disposed against said smaller diameter portion.

5. The magnetic tape system as set forth in claim 4, wherein said drive roller has a larger diameter portion, on which the contact surface of said drive roller is disposed, and a smaller diameter portion, said magnetic tape being disposed between the smaller diameter portions of said driven roller and said drive roller.

6. The magnetic tape system as set forth in claim 1, wherein said at least one layer of elastomeric material forming said contact surface of said driven roller is chemically bonded in place by molding.

7. The magnetic tape system as set forth in claim 1, wherein said driven roller has a smaller diameter portion, and said drive belt is in frictional contact with said smaller diameter portion of said driven roller so as to effect the movement of said magnetic tape between said spools.

8. A magnetic tape cartridge for use with a magnetic tape drive having a drive roller with an annular contact surface formed by a layer of elastomeric material, said magnetic tape cartridge comprising:

a housing;

two tape spools mounted in said housing generally coplanar to one another;

two tape guides mounted so as to be spaced apart in said housing;

a magnetic tape connected between said spools, wound around at least one of said spools, and guided between said spools by said tape guides;

a driven roller having a larger diameter portion and a smaller diameter portion, said larger diameter portion having at least one layer of elastomeric material forming a contact surface, said driven roller being mounted in said housing and dimensioned so as to allow said contact surface to make frictional contact with a contact surface of elastomeric material on a drive roller;

two guide rollers mounted so as to be spaced apart in said housing; and a drive belt mounted in a continuous loop around said guide rollers and being in frictional contact with said smaller diameter of said driven roller so as to be moved along said loop when said driven roller is driven, said drive belt being in frictional engagement with each of said spools so as to move said magnetic tape between said spools as said drive belt is moved.

9. The magnetic tape cartridge as set forth in claim 8, wherein said magnetic tape is disposed below said larger diameter portion and in front of said smaller diameter portion so as to be between said driven roller and the drive roller, but not between their respective contact surfaces, when said magnetic tape cartridge is moved into engagement with the magnetic tape drive.

10. The magnetic tape cartridge as set forth in claim 8, wherein said driven roller has a larger diameter portion and a smaller diameter portion, the contact surface of said driven roller is disposed on said larger diameter portion, and said drive belt is disposed against said smaller diameter portion.

11. The magnetic tape cartridge as set forth in claim 8, wherein said at least one layer of elastomeric material forming said contact surface of said driven roller is chemically bonded in place by molding.

12. The magnetic tape cartridge as set forth in claim 8, wherein said magnetic tape cartridge is a computer data mini cartridge.

13. A magnetic tape system comprising:

a magnetic tape drive comprising a drive roller and a drive mechanism for driving said drive roller, said drive roller having a first annular contact surface formed by at least one layer of elastomeric material; and a magnetic tape cartridge operatively adapted to engage said magnetic tape drive system, said cartridge comprising:

a housing;

two spools mounted in said housing generally coplanar to one another;

two tape guides mounted so as to be spaced apart in said housing;

a magnetic tape connected between said spools, wound around at least one of said spools, and guided between said spools by said tape guides;

a driven roller having a larger diameter portion and a smaller diameter portion, said larger diameter portion having at least one layer of elastomeric material forming a second annular contact surface, said driven roller being mounted in said housing and operatively adapted to allow said second annular contact surface to make frictional contact with said first annular contact surface of said drive roller when said magnetic tape cartridge is engaged with said magnetic tape drive;

two guide rollers mounted so as to be spaced apart in said housing; and a drive belt mounted in a continuous loop around said guide rollers and being moved by said driven roller along said loop when said driven roller is driven by said drive roller, said drive belt being in frictional engagement with each of said spools to wind said magnetic tape onto one of said spools as said drive belt is moved, wherein said drive roller drives said driven roller by bringing said first annular contact surface and said second annular contact surface in contact under an applied contact force while said drive mechanism drives said drive roller, and each of said first annular contact surface and said second annular contact surface is formed from an elastomeric material to enable said drive roller to drive said driven roller under an applied contact force that is lower than the contact force needed between contact surfaces formed from an elastomeric material and a hard plastic material which provides a surface having a low coefficient of friction.

14. The magnetic tape system as set forth in claim 13, wherein said at least one layer of elastomeric material forming said contact surface of said driven roller is chemically bonded in place by molding.

15. The magnetic tape system as set forth in claim 13, wherein said drive belt is in frictional contact with said smaller portion of said driven roller so as to be moved by said driven roller along said loop when said driven roller is driven by said drive roller.

* * * * *